(12) United States Patent
Petrick et al.

(10) Patent No.: US 12,448,136 B2
(45) Date of Patent: Oct. 21, 2025

(54) TWO-PIECE ENGINE COLLAR

(71) Applicant: Textron Innovations Inc., Providence, RI (US)

(72) Inventors: Natalie Ann Petrick, Wichita, KS (US); Nelson Albert Pratt, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 18/594,746

(22) Filed: Mar. 4, 2024

(65) Prior Publication Data

US 2025/0276798 A1 Sep. 4, 2025

(51) Int. Cl.
*B64D 27/40* (2024.01)
*B64D 33/02* (2006.01)
*F02C 7/20* (2006.01)

(52) U.S. Cl.
CPC .......... *B64D 27/402* (2024.01); *B64D 27/40* (2024.01); *B64D 27/404* (2024.01); *B64D 27/406* (2024.01); *B64D 2033/0293* (2013.01); *F02C 7/20* (2013.01); *F05D 2230/60* (2013.01)

(58) Field of Classification Search
CPC .... B64D 27/402; B64D 27/40; B64D 27/404; B64D 27/406; B64D 2033/0293
See application file for complete search history.

(56) References Cited

U.S. PATENT DOCUMENTS

| | | | |
|---|---|---|---|
| 4,531,694 A * | 7/1985 | Soloy | B64D 27/14 244/54 |
| 2017/0240288 A1* | 8/2017 | Pautis | B64D 27/404 |
| 2023/0192306 A1* | 6/2023 | Matson | B64D 27/402 244/54 |

* cited by examiner

*Primary Examiner* — Gerald L Sung
*Assistant Examiner* — Rene D Ford
(74) *Attorney, Agent, or Firm* — SLATER MATSIL, LLP (57) ABSTRACT

An engine collar, aircraft, and method of installing an engine in an aircraft are provided. The engine collar includes a first engine collar piece, including a first portion of a ring, a second engine collar piece, including a second portion of a ring, and a plurality of splice plates joining the first engine collar piece to the second engine collar piece; where each of the first engine collar piece and the second engine collar piece have two engine isolation mounting points and a plurality of attachment points for connecting the engine collar to a plurality of engine supports.

20 Claims, 8 Drawing Sheets

TWO-PIECE ENGINE COLLAR

TECHNICAL FIELD

The present invention relates generally to an improved engine collar design in an aircraft using a turboprop engine, and more specifically to an engine collar that is capable of supporting 45 degree (45°) engine isolators while still maintaining ideal drop-in installation/removal of a turboprop engine.

BACKGROUND

The General Electric™ turboprop engine for the Beechcraft™ Denali™ presented a novel issue of having four 45° isolators located along the engine circumference. The 45° orientation reduced engine vibration, improved engine performance and reduced the engine box structural weight. However, as legacy turboprop engines typically had four 30° isolators with a single collar piece, a new design was necessary. Utilizing previous designs with a single collar piece would require both the structural trusses and collar to be installed on the new turboprop engine prior to installation in the aircraft, reducing efficiency, and making engine drop-in/removal much more complicated and costly. Previously used bent-tube engine collars further exhibited a high scrap rate due to a lack of precision with aligning multiple attachment location. Accordingly, a new design was needed that still enabled an easy drop-in engine installation, reduced scrap rate, and provided necessary precision to align the collar splice, (4) isolators and support truss tubes.

SUMMARY

In accordance with a preferred embodiment of the present invention, an improved two-piece machined engine collar comprises as follows.

In a first embodiment, an engine collar includes: a first engine collar piece, including a first portion of a ring, and having a back portion, where the back portion is flat on a first side and has, on a second side opposite the first side, a raised outer sidewall along an outer circumference, a raised inner sidewall along an inner circumference, and a plurality of connecting walls spaced apart from each other running from the raised outer sidewall to the raised inner sidewall, and where the connecting walls are substantially perpendicular to a tangent of the raised inner sidewall and raised outer sidewalls along a major axis of the connecting walls; a second engine collar piece, including a second portion of a ring, and having a back portion, where the back portion is flat on a first side and has, on a second side opposite the first side, a raised outer sidewall along an outer circumference, a raised inner sidewall along an inner circumference, and a plurality of connecting walls spaced apart from each other running from the raised outer sidewall to the raised inner sidewall, where the connecting walls are substantially perpendicular to the tangent of the raised inner sidewall and raised outer sidewalls along the major axis of the connecting walls, and where the first engine collar piece including the first portion of the ring and the second engine collar piece including the second portion of the ring together include a complete ring; and a plurality of splice plates joining the first engine collar piece to the second engine collar piece; where each of the first engine collar piece and the second engine collar piece have two engine isolation mounting points and a plurality of attachment points for connecting the engine collar to a plurality of engine supports.

In a second embodiment, an aircraft includes an engine, four engine isolators, a plurality of engine supports, and an engine collar, where the engine collar includes: a first engine collar piece, having a back portion flat on a first side, and, on a second side opposite the first side, having a raised outer sidewall along an outer circumference of the first engine collar piece, a raised inner sidewall along an inner circumference of the first engine collar piece, and a plurality of connecting walls spaced apart from each other running a length between the raised outer sidewall and the raised inner sidewall; a second engine collar piece, having a back portion flat on a first side, and, on a second side opposite the first side, having a raised outer sidewall along an outer circumference of the second engine collar piece, a raised inner sidewall along an inner circumference of the second engine collar piece, and a plurality of connecting walls spaced apart from each other running a length between the raised outer sidewall and the raised inner sidewall; and a plurality of splice plates joining the first engine collar piece to the second engine collar piece at a narrow portion of the engine, where the engine is wider forward of the narrow point of the engine and wider aft of the narrow point of the engine; where the first engine collar piece and the second engine collar piece together form a ring around the engine; and where the engine collar is connected to the engine on a first side of the engine collar by the four engine isolators, and where the engine collar is connected to the aircraft on a second side of the engine collar through the plurality of engine supports.

In a third embodiment a method of installing an engine in an aircraft includes: attaching four engine isolators to the engine at mounting points spaced around a circumference of the engine, where the engine is narrower at the engine mounting points than at least of a portion of the engine forward of the engine mounting points, and a portion of the engine aft of the engine mounting points; attaching a first engine collar piece to two of the four engine isolators using fasteners protruding through two engine isolation mounting points protruding inward from an inner circumference of the first engine collar piece; attaching a second engine collar piece to the remaining two of the four engine isolators using fasteners protruding through two engine isolation mounting points protruding inward from an inner circumference of the second engine collar piece; joining the first engine collar piece to the second engine collar piece using a plurality of splice plates and fasteners extending through the first engine collar piece or the second engine collar piece to form an engine collar; connecting the engine using the engine collar by dropping the engine into position on a plurality of first supports in the aircraft; fastening at least one of the first engine collar piece or the second engine collar piece to the plurality of first supports; installing a plurality of second supports in the aircraft; and fastening the plurality of second supports to the engine collar.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments of the presented principles are directed toward an improved machined two-piece engine collar design used in, for example, an airframe utilizing a turboprop engine. The system provides high-quality parts that can be customized, resulting in tighter tolerance, improved manufacturing reliability, reduced scrap rates, reduced vibration transfer from a turboprop engine to the airframe, improved engine performance, and reduced the engine box structural weight, while still maintaining ideal drop-in/removal capability for ease of construction, maintenance, and replacement.

Traditional turboprop engine isolators were located at 30 degrees (30°) offsets on either side of a centerline diameter (i.e., at 60 degree (60°) spacing between a first and second engine isolator and a third and fourth engine isolator with 120 degree (120°) spacing between the second and third engine isolator and the fourth and first engine isolator when viewed in sequence around the engine circumference). Some new turboprop engine designs have presented a novel issue of having four engine isolators located at 45 degrees (45°) along the engine circumference (i.e., the spacing between each engine isolator being 90 degrees (90°)). The 45° orientation results in reduced engine vibration, improved engine performance, and reduced engine box structural weight. However, the new engine isolator spacing presents a challenge in how to drive the engine load from the engine isolators back to the airframe while still maintaining ideal drop-in installation/removability that is present in other engine support structures. A two-piece machined collar design was able to achieve this design goal while also providing other advantages.

Figure 1:
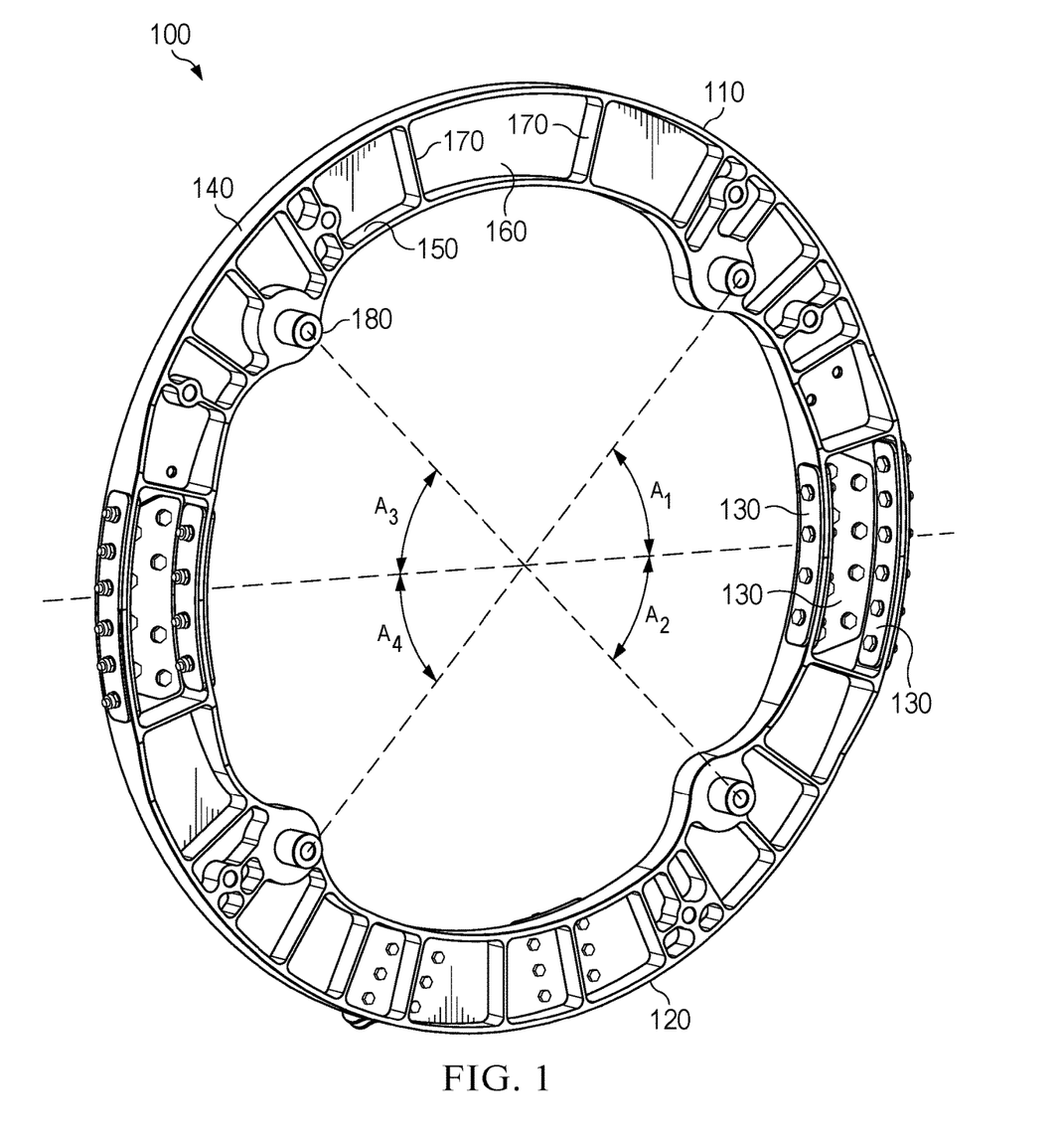
FIGS. 1 through 4 are alternative views of a two-piece engine collar design according to some embodiments.

FIG. 1 shows a first view of an assembled two-piece engine machined collar design according to some embodiments. The engine collar 100 has an upper collar piece 110, a lower collar piece 120 and one or more splice plates 130 are used to bind the upper collar piece 110 to the lower collar piece. Each of the upper collar piece 110 and the lower collar piece 120 has an outer sidewall 140, an inner sidewall 150, a solid back plate 160, and a number of connecting walls 170 between the outer sidewall 140 and the inner sidewall 150.

In some embodiments, the upper collar piece 110 and the lower collar piece 120 may each comprise approximately 180 degrees (180° of the total circumference of the of the engine collar 100. For the purposes of this disclosure "approximately 180 degrees" here means within a few degrees of 180 degrees (180°) with sufficient space to allow for mechanical and fabrication tolerances between the upper collar piece 110 and the lower collar piece 120. In other embodiments, one collar piece may comprise more than 180 degrees (180°) of the total circumference of the collar 100 such that the other collar piece comprises less than 180 degrees (180°) of the total circumference of the collar 100.

In some embodiments, the upper collar piece 110 and the lower collar piece 120 may be fabricated from 4340 steel with a tensile yield strength of 180 to 200 kilopounds per square inch (KSI). In some embodiments the upper collar piece 110 and the lower collar piece 120 may conform to the AMS6414 standard as published by SAE International.

In some embodiments the upper collar piece 110 and the lower collar piece 120 may be fabricated using a negative removal fabrication process such as a milling machine, a computer numerical control (CNC) router, or the like. In some embodiments, the thickness of the solid back plate 160 of the upper collar piece 110 and the lower collar piece 120 may be 0.10 inches±10%.

Engine isolation mounting points 180 are located at approximately 45 degrees (45°) from a centerline as shown by angles $A_1$ through $A_4$. For the purposes of this disclosure, approximately 45 degrees means±2.5 degrees (2.5°). In some embodiments, the engine isolation mounting points 180 may be located on tabs extending in towards a center point of the engine collar 100 from the inner sidewall 150.

Figure 2:
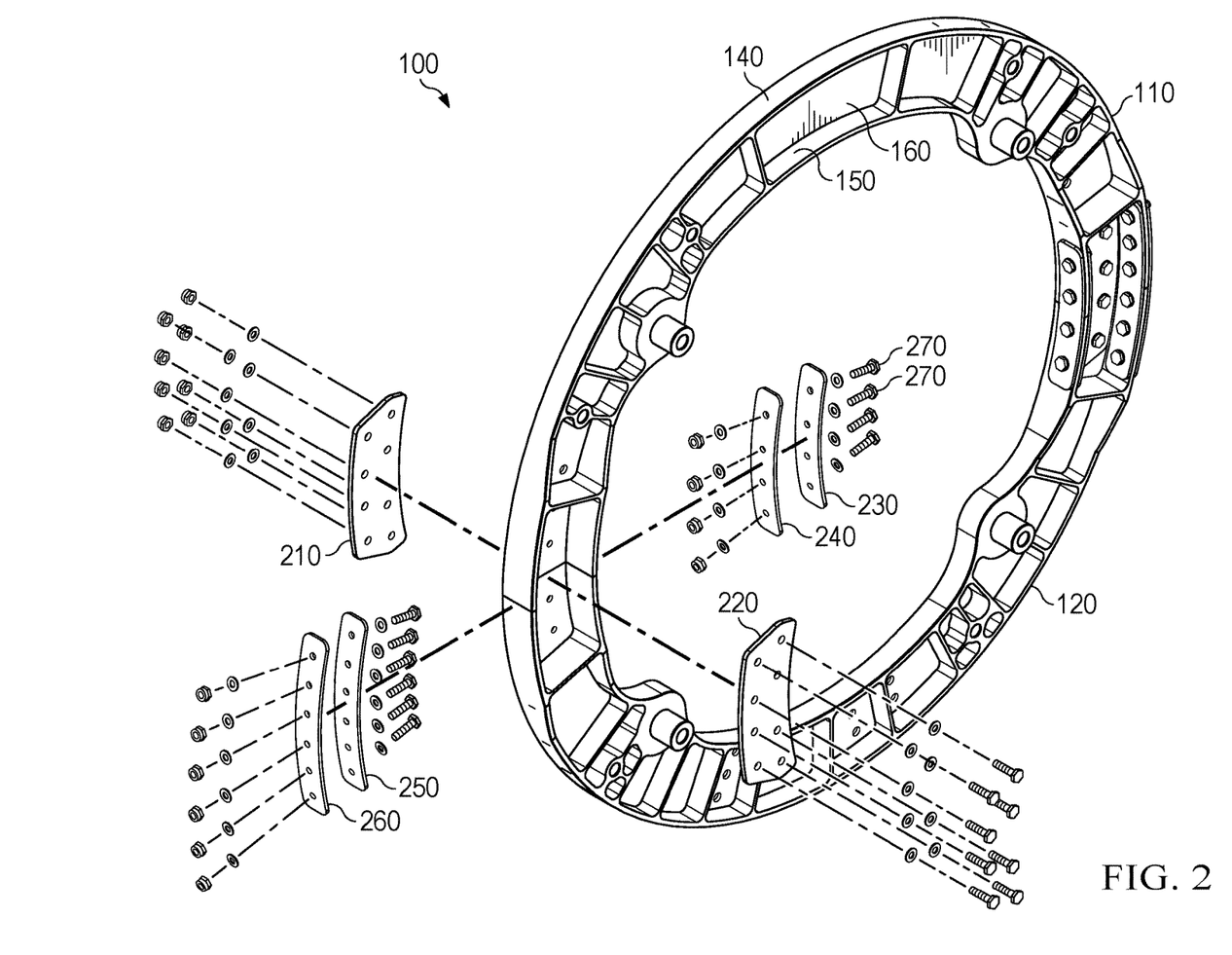

FIG. 2 illustrates an engine collar 100 with the splice plates 130 separated from the engine collar 100 body according to some embodiments. The upper collar piece 110 and the lower collar piece 120 are held together on each side of the engine collar 100 by a back splice plate 210, a front splice plate 220, an inner wall inner splice plate 230, and inner wall outer splice plate 240, and outer wall inner splice plate 250, and an outer wall outer splice plate 260 (collectively, "splice plates 130"). In some embodiments, the back splice plate 210 and the front splice plate 220 are fastened together on either side of the solid back plate 160 portion of the upper collar piece 110 and the lower collar piece 120 using fasteners 270 that extend through the back splice plate 210, the front splice plate 220, and the solid back plate 160 portion of either the upper collar piece 110 or the lower collar piece 120. Similarly, the inner wall inner splice plate 230 and the inner wall outer splice plate 240 are held together by fasteners 270 that extend through the inner wall inner splice plate 230 and the inner wall outer splice plate 240, as well as the inner sidewall 150 of either the upper collar piece 110 or the lower collar piece 120. Further, the outer wall inner splice plate 250 and the outer wall outer splice plate 260 are held together by fasteners 270 that extend through the outer wall inner splice plate 250, the outer wall outer splice plate 260, and the outer sidewall 140 of either the upper collar piece 110 or the lower collar piece 120. In some embodiments, the fasteners are nuts and bolts with washers on either side of the fastening surfaces. In other embodiments, the fasteners may include screws, rivets, or the like.

In some embodiments, the splice plates 130 may each be fabricated from 17-7PH stainless steel. In some embodiments the splice plates 130 may conform to the AMS 5528, AMS 5529, and/or AMS 5644 standards as published by SAE International. In other embodiments, the splice plates may be fabricated from another suitable material such as a metal, alloy, polymer, composite, ceramic, or the like, or a combination of materials.

Figure 3:
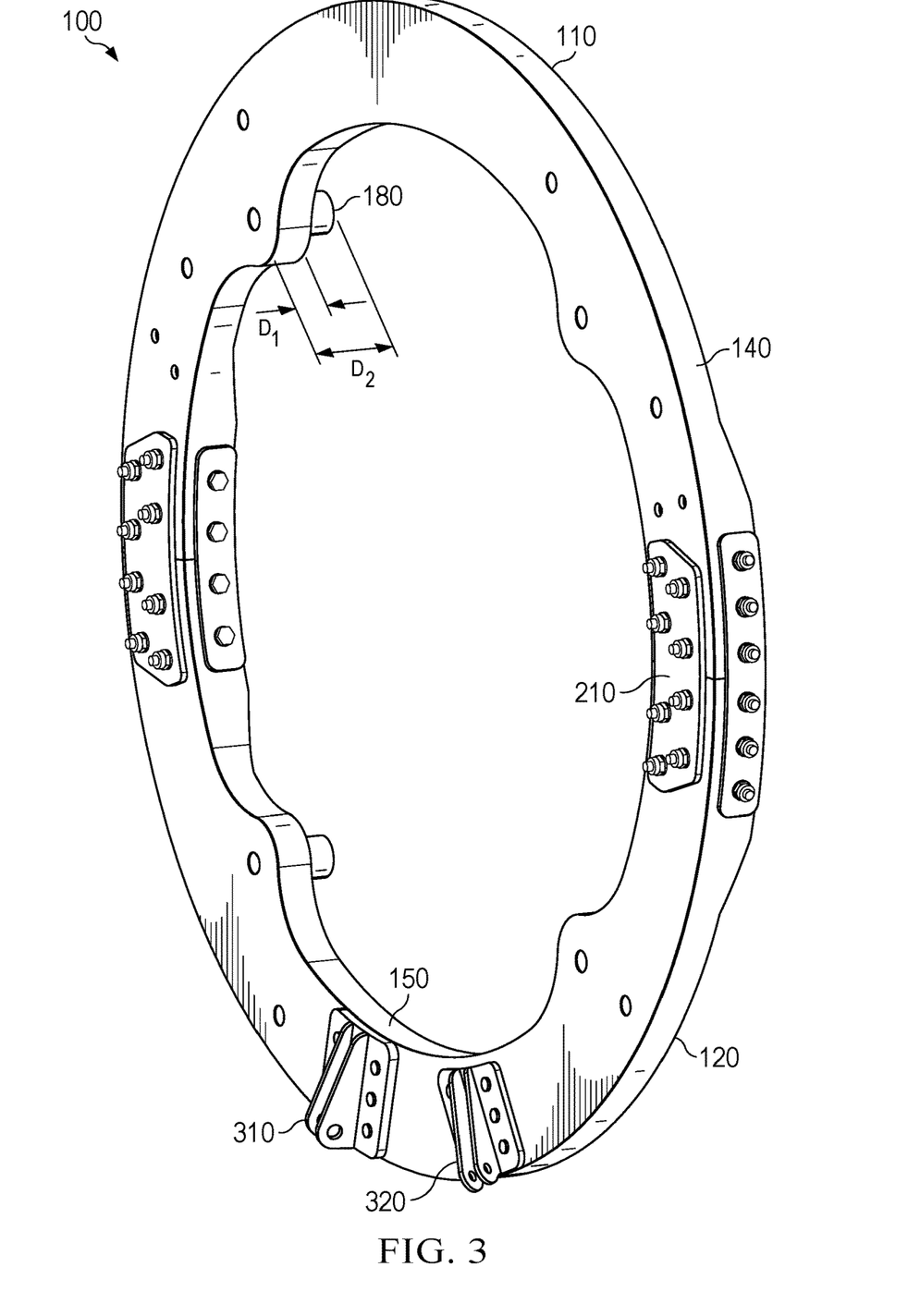

FIG. 3 illustrates an alternate view of the engine collar 100 according to some embodiments. As shown, the back splice plate 210 may further be seen connecting the upper collar piece 110 and the lower collar piece 120. In some embodiments, the engine collar 100 may further include nose wheel well fittings 310 and 320 attached to the lower collar piece 120. The nose wheel well fittings 310 and 320 may be connected to the engine collar via fasteners such as bolts, and a landing gear assembly (not shown here) may be connected to protruding tabs of the nose wheel well fittings 310 and 320 using, for example, pins, bolts, or the like.

In some embodiments, the distance $D_1$ of the upper collar piece 110 and the lower collar piece 120 from the back face to the top of the outer sidewall 140 and/or inner sidewall 150 may be 1.0 inches±10%. In some embodiments, the engine isolation mounting points 180 may protrude further than the sidewalls of the upper collar piece 110 and the lower collar piece 120 such that a distance $D_2$ from the back face to the top of engine isolation mounting points 180 may be 2.0 inches±10%.

Figure 4:
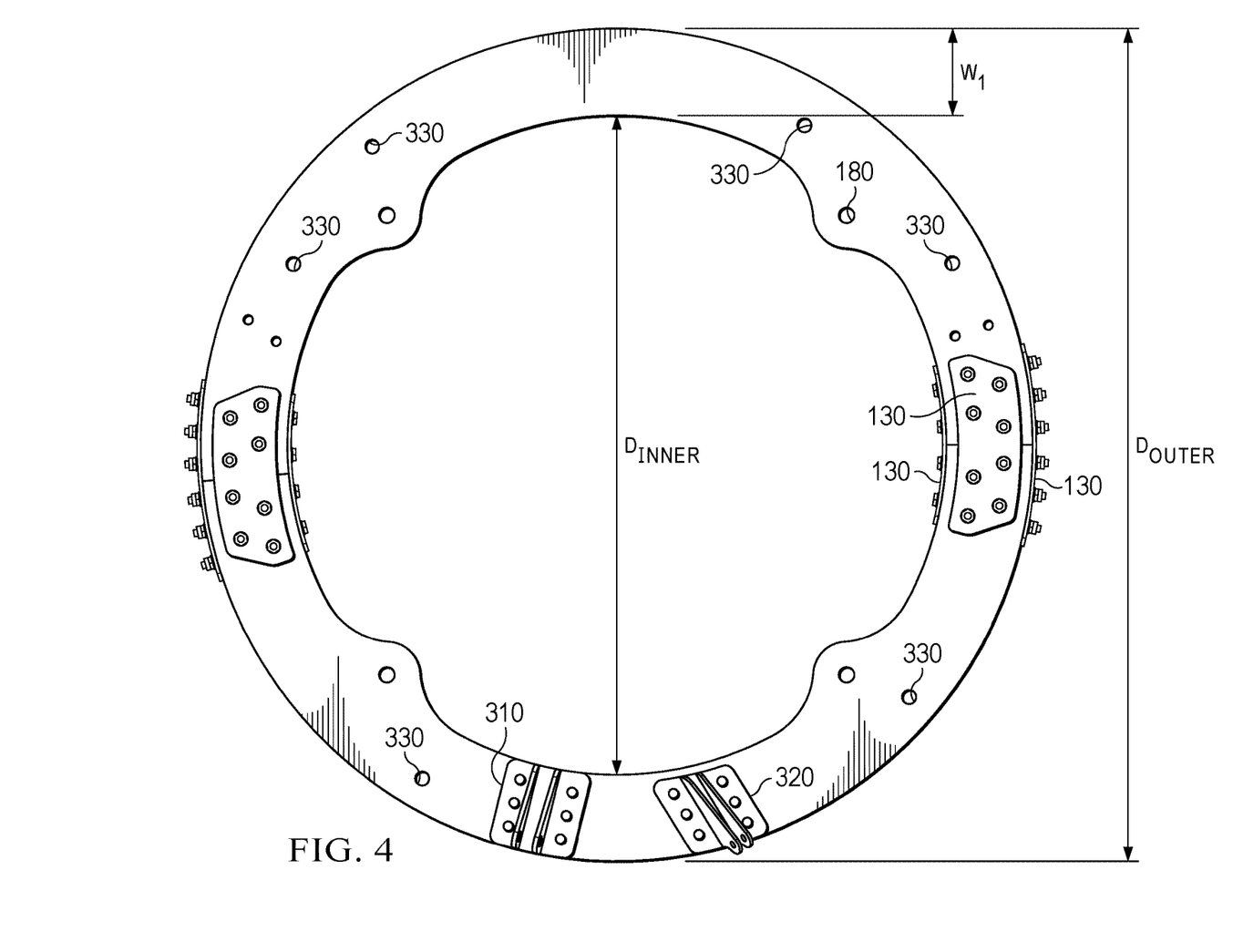

FIG. 4 illustrates an alternative view of the engine collar 100 according to some embodiments. The upper collar piece 110 and the lower collar piece 120 are joined to each other utilizing the splice plates 130. In some embodiments, an inner diameter $D_{inner}$ of the engine collar 100 may be 25.75 inches±10%. In some embodiments an outer diameter $D_{outer}$ of the engine collar 100 may be 20.50 inches±10%. This results in a width $W_1$ of the engine collar 100 being approximately 5.25 inches±10%.

In some embodiments, the engine collar 100 includes mounting holes 330 for attaching the engine collar 100 to engine support trusses (not shown here).

Figure 5:
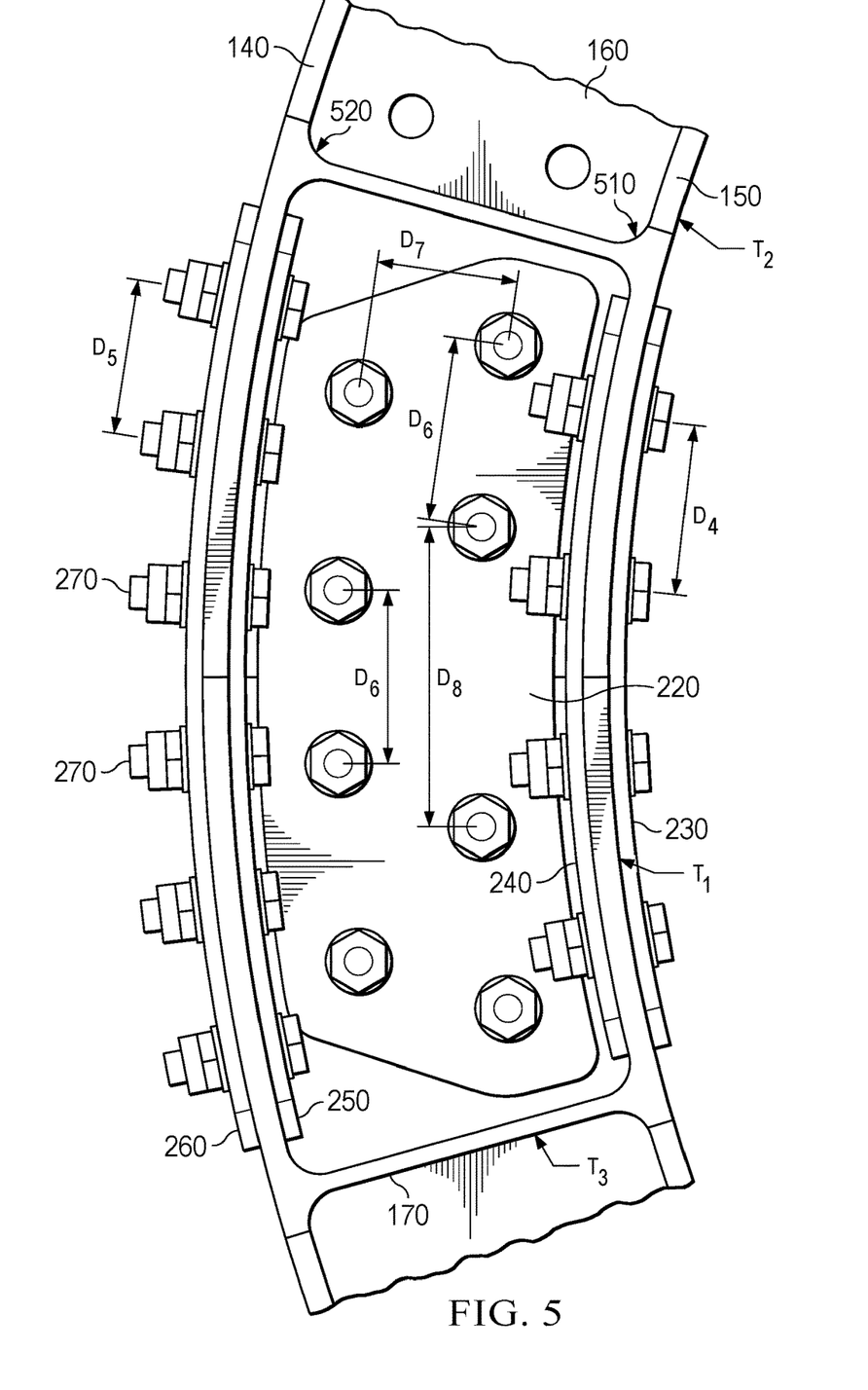
FIG. 5 is a partial view of the splice plates joining the two pieces of the engine collar according to some embodiments.

FIG. 5 is partial view of the engine collar 100 showing the splice plates 130 according to some embodiments. In some embodiments, the outer sidewall 140 and inner sidewall 150 have a thickness of 0.15 inches±10%. In some embodiments, the connecting walls 170 have thicknesses between 0.05 inches and 0.10 inches. In some embodiments, the sidewall interface 510 between the inner sidewall 150 or the outer sidewall 140 and the connecting walls 170 may have a rounded shape. Further, the backplane interface 520 between inner sidewall 150/outer sidewall 140/connecting walls 170 and the solid back plate 160 may be rounded as well. In other embodiments, an angular or squared sidewall interface and/or backplane interface may be utilized.

In some embodiments, the splice plates 130 each have a thickness T1 of 0.08 inches±10%. In some embodiments spacing $D_4$ between fasteners 270 for the inner wall inner splice plate 230 and the inner wall outer splice plate 240 is between 1.14 inches to 1.30 inches. In some embodiments spacing $D_5$ between fasteners 270 for the outer wall inner splice plate 250 and the outer wall outer splice plate 260 is between 0.96 inches to 1.16 inches. In some embodiments, spacing $D_6$ between rows of fasteners 270 for the back splice plate 210 (not shown) and the front splice plate 220 is between 1.25 inches to 1.35 inches. Spacing $D_7$ between rows of fasteners for the back splice plate 210 (not shown) and the front splice plate 220 is 1.0 inch±10%. In some embodiments, where a bolt would be located on the joint between the upper collar piece 110 and the lower collar piece 120, a larger distance $D_8$ between bolts may be selectively utilized.

Figure 6:
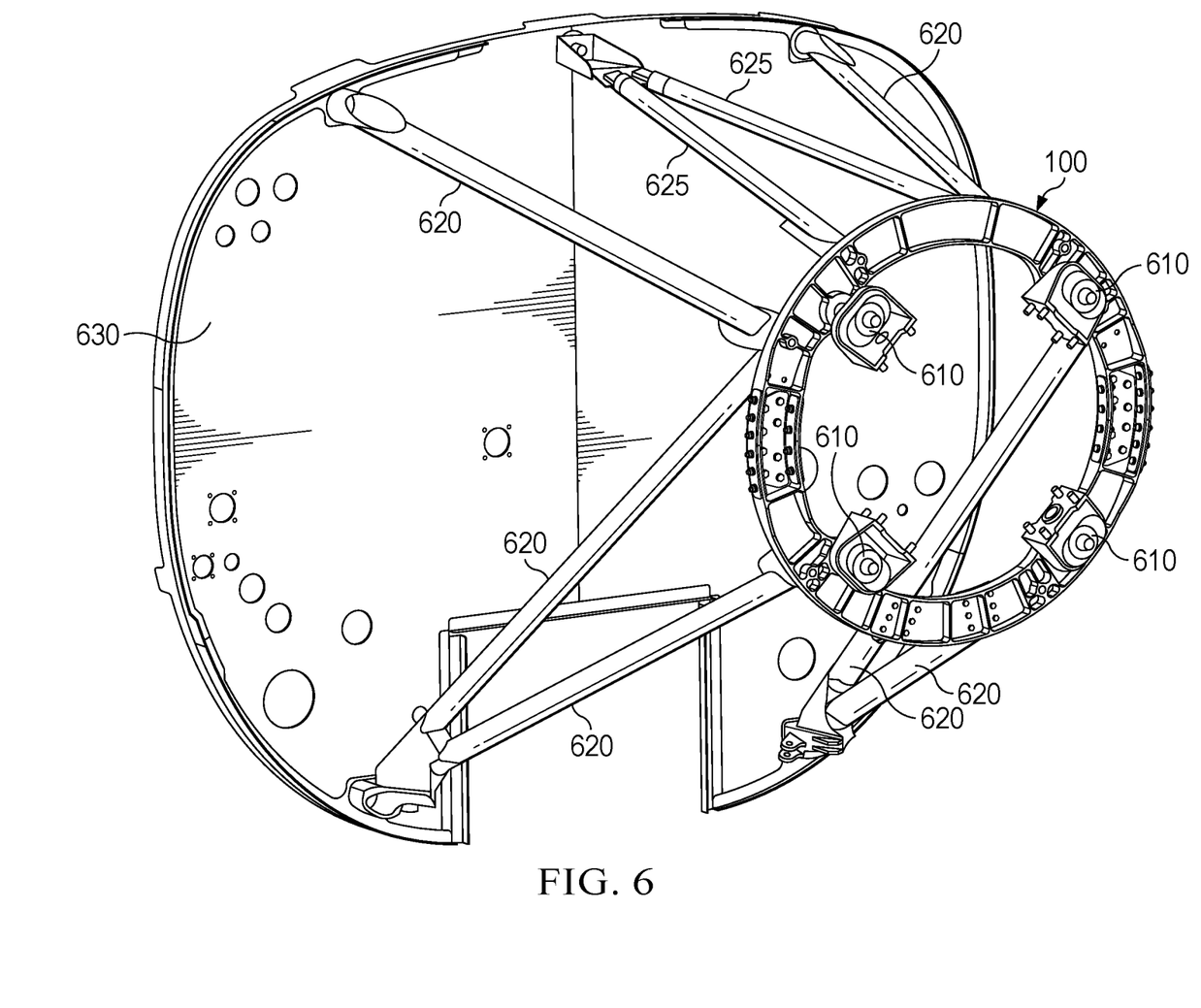
FIG. 6 is a view of the two-piece engine collar installed on an aircraft engine support system according to some embodiments.

FIG. 6 illustrates a potential embodiment of the engine collar 100 installed in an aircraft frame. Engine supports 620 and 625 attach to the engine collar 100 at points around the engine collar 100 on one side of each engine support 620 and 625, and to a forward pressure bulkhead 630 of the airframe 750. The engine supports 620 and 625, support the weight of the engine (not shown), and transfer thrust produced by the engine to the airframe 750. Engine isolators 610 connect the engine collar 100 to the engine (not shown). In some embodiments, the engine isolators 610 may include a dampening system to limit vibration transfer from the engine (not shown) to the airframe 750.

Figure 7:
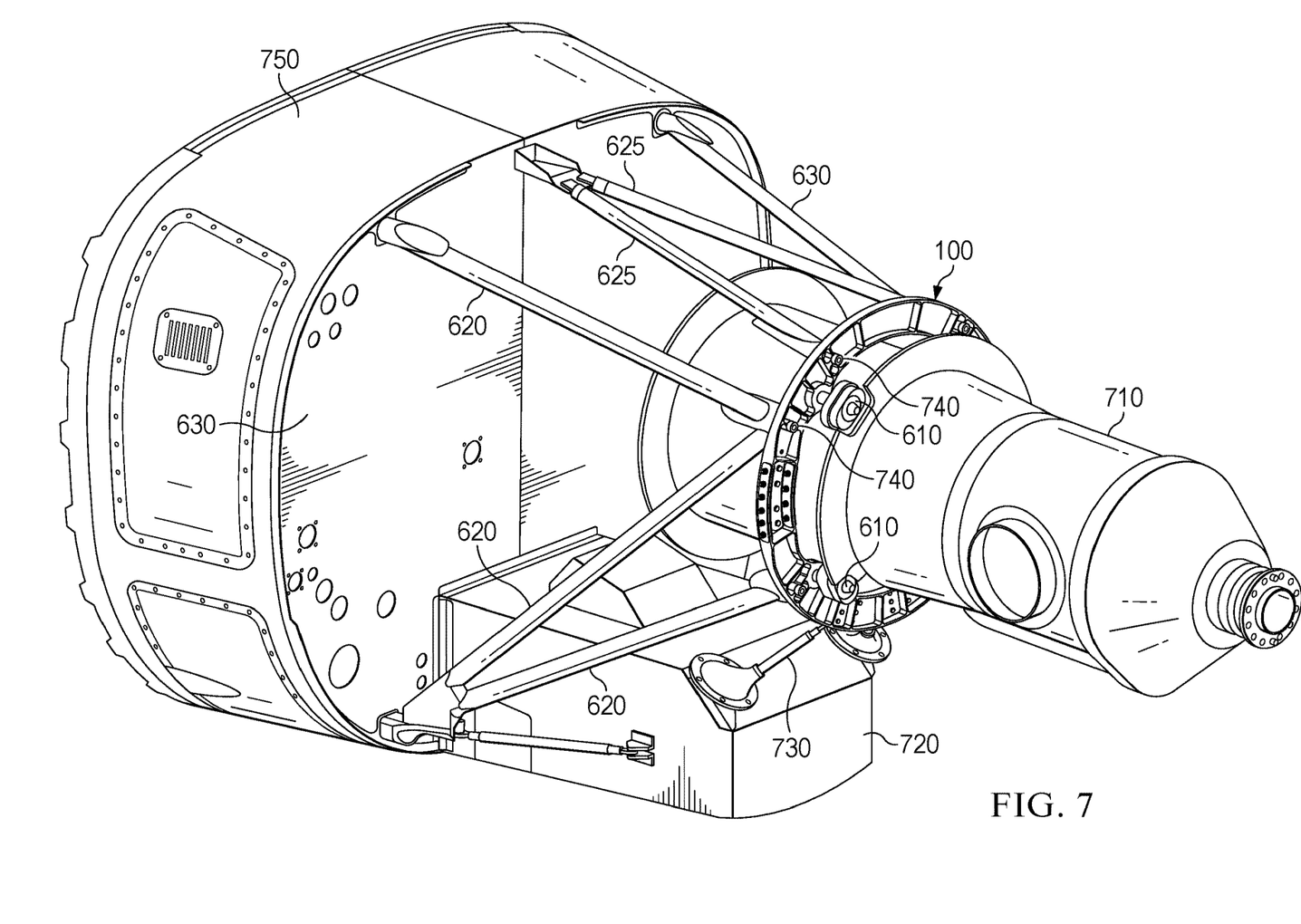
FIG. 7 is a view of the two-piece engine collar and turboprop engine installed on an aircraft engine support system according to some embodiments.

FIG. 7 shows an embodiment of the engine collar 100 attachment to a turboprop engine 710. In some embodiments, a nose landing gear wheel well 720 may be attached to the engine collar 100 at the nose wheel well fittings 310 and 320 (see FIG. 3) using secondary supports 730. Accordingly, the engine collar 100 may provide additional load bearing capability for the nose landing gear wheel well 720, in conjunction with engine supports 620 and 625. As can be seen in the figure, the engine collar 100 is connected to mounting points on the turboprop engine 710 through engine isolators 610.

Figure 8:
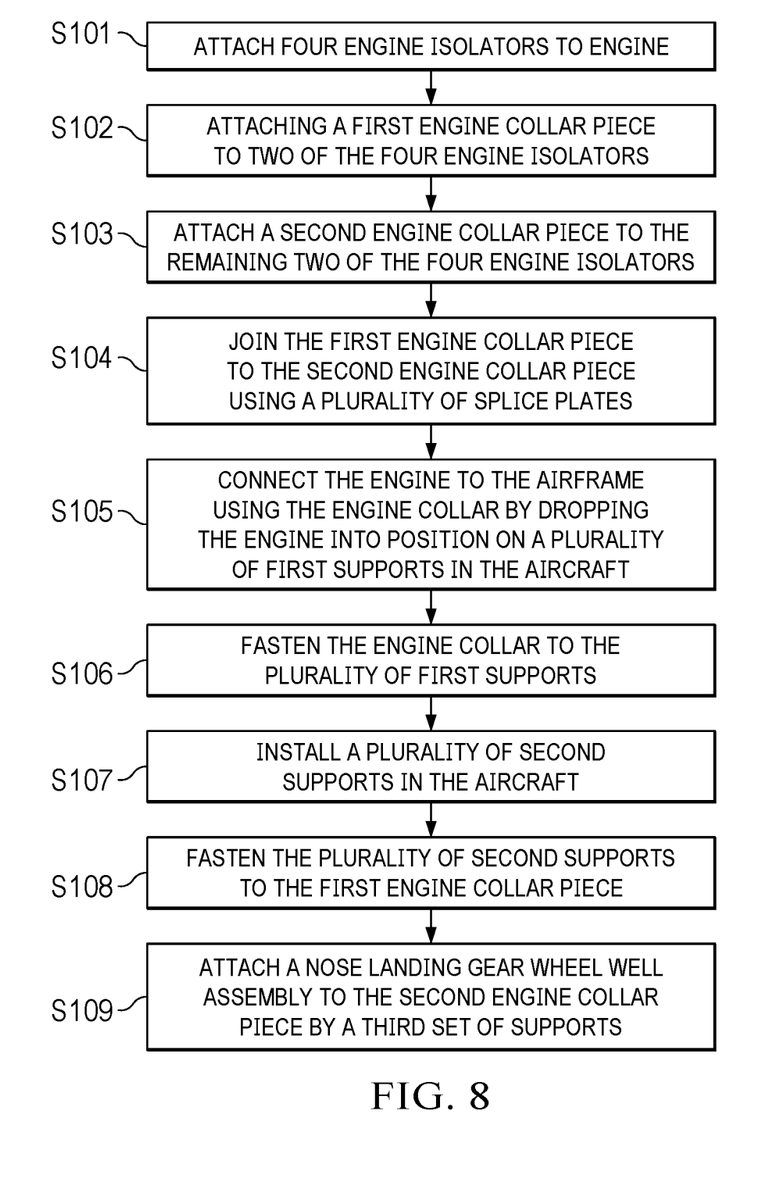
FIG. 8 is a method for installing an engine according to some embodiments.

In some embodiments, to install a turboprop engine in an aircraft using the above described engine collar is shown in FIG. 8. Installation may comprise the following steps. The order of steps may be varied in some embodiments.

S101 comprises attaching four engine isolators 610 to the turboprop engine 710 at mounting points spaced around a circumference of the turboprop engine 710. In S102, the upper collar piece 110 is attached to two of the four engine isolators 610 using two engine isolation mounting points 180 protruding inward from an inner circumference of the upper collar piece 110. In S103, the lower collar piece 120 may then be attached to the remaining two of the four engine isolators 610 using two engine isolation mounting points 18 protruding inward from an inner circumference of the lower collar piece 120. In some embodiments the engine isolators 610 may be attached to the upper collar piece 110 and lower collar piece 120 using fasteners such as bolts, screws, pins, rivets, or the like.

In S104, the upper collar piece 110 and lower collar piece 120 may then be joined together around the turboprop engine 710. In some embodiments the upper collar piece 110 and lower collar piece 120 may be joined using a plurality of splice plates 130. In some embodiments, the upper collar piece 110 and the lower collar piece 120 may be held together on each side of the engine collar 100 by a back splice plate 210, a front splice plate 220, an inner wall inner splice plate 230, and inner wall outer splice plate 240, and outer wall inner splice plate 250, and an outer wall outer splice plate 260 (collectively, "splice plates 130"). In some embodiments, the back splice plate 210 and the front splice plate 220 are fastened together on either side of the solid back plate 160 portion of the upper collar piece 110 and the lower collar piece 120 using fasteners 270 that extend through the back splice plate 210, the front splice plate 220, and the solid back plate 160 portion of either the upper collar piece 110 or the lower collar piece 120. Similarly, the inner wall inner splice plate 230 and the inner wall outer splice plate 240 are held together by fasteners 270 that extend through the inner wall inner splice plate 230 and the inner wall outer splice plate 240, as well as the inner sidewall 150 of either the upper collar piece 110 or the lower collar piece 120. Further, the outer wall inner splice plate 250 and the outer wall outer splice plate 260 are held together by fasteners 270 that extend through the outer wall inner splice plate 250, the outer wall outer splice plate 260, and the outer sidewall 140 of either the upper collar piece 110 or the lower collar piece 120. In some embodiments, the fasteners are nuts and bolts with washers on either side of the fastening surfaces. In other embodiments, the fasteners may include screws, rivets, or the like.

In some embodiments, the joined engine collar 100 encircles the turboprop engine 710 at a narrow point towards the middle of the turboprop engine 710. In some embodiments, at least of a portion of the turboprop engine 710 forward of the engine mounting points, and a portion of the turboprop engine 710 aft of the engine mounting points is wider than the opening in the engine collar 100. In some embodiments, S104 may be performed before either or both of S102 and/or S103 described above.

S015 comprises dropping the combined turboprop engine 710 and engine collar 100 into position in the airframe 750. In some embodiments, a first plurality of engine supports 625 are not yet installed in the airframe 750. Accordingly, in S106, the engine collar 100 is attached to a second plurality of engine supports 620 installed in the airframe 750 prior to dropping the turboprop engine 710 into position in S105. This permits installation of the turboprop engine 710 with the engine collar 100 already installed, and with the engine isolators 610 in approximately 90 degree spacing from each other, and spaced about 45 degrees from the engine collar 100 join points.

In some embodiments, the engine supports 620 attach to the engine collar 100 at points around the engine collar 100 on one side of each engine support 620, and to a forward pressure bulkhead 630 of the airframe 750 on an opposite side of each engine support 620. In S107, the first plurality of engine supports 625 may then be installed between the forward pressure bulkhead 630 of the airframe 750. In S108, the first plurality of engine supports 625 may be fastened to the engine collar. The engine supports 620 and 625 may be fastened to the engine collar 100 using bolts, screws, pins, rivets, or the like.

In some embodiments, optional S109 may include attaching a nose landing gear wheel well 720 to the lower collar piece 120 by secondary supports 730, where the secondary supports 730 provide structural support to the nose landing gear wheel well 720 through the engine collar 100, and the engine supports 620 and 625.

Due to the various protrusions and the irregular shape of the turboprop engine 710, merely removing the engine isolators 610 from the engine collar 100 would not facilitate drop-in installation or removability while still maintaining proper support to drive the engine load from the engine isolators 610 back to the airframe 750. However, by utilizing a two-piece engine collar design as described above, tight tolerances may be maintained to properly support and align a turboprop engine 710 within an airframe, resulting in reduced engine vibration, improved engine performance, and reduced engine box structural weight. Further, by removing fasteners 740 to disconnect the engine collar 100 from the engine supports 620, the turboprop engine 710 (with the engine collar 100 and engine isolators still attached) may be easily removed from the airframe 750 for maintenance, inspection, replacement, or the like, with minimal disassembly required. Additionally, a two-piece engine collar design exhibits a lower scrap rate in manufacturing than conventional methods, improving repeatability and cost.

In one embodiment, an engine collar includes a first engine collar piece, including a first portion of a ring, and having a back portion, where the back portion is flat on a first side and has, on a second side opposite the first side, a raised outer sidewall along an outer circumference, a raised inner sidewall along an inner circumference, and a plurality of connecting walls spaced apart from each other running from the raised outer sidewall to the raised inner sidewall, and where the connecting walls are substantially perpendicular to a tangent of the raised inner sidewall and raised outer sidewalls along a major axis of the connecting walls; a second engine collar piece, including a second portion of a ring, and having a back portion, where the back portion is flat on a first side and has, on a second side opposite the first side, a raised outer sidewall along an outer circumference, a raised inner sidewall along an inner circumference, and a plurality of connecting walls spaced apart from each other running from the raised outer sidewall to the raised inner sidewall, where the connecting walls are substantially perpendicular to the tangent of the raised inner sidewall and raised outer sidewalls along the major axis of the connecting walls, and where the first engine collar piece including the first portion of the ring and the second engine collar piece including the second portion of the ring together include a complete ring; and a plurality of splice plates joining the first engine collar piece to the second engine collar piece; where each of the first engine collar piece and the second engine collar piece have two engine isolation mounting points and a plurality of attachment points for connecting the engine collar to a plurality of engine supports.

In some embodiments of the engine collar, each engine isolation mounting point is 87.5 degrees to 92.5 degrees from a closest next engine isolation mounting point around a circumference of the engine collar. In some embodiments, each engine isolation mounting point is disposed in a tab extending in from the raised inner sidewall of the first engine collar piece or the second engine collar piece, where each tab is shaped as a rounded protrusion inward from the raised inner sidewall along a major plane of the engine collar, and where each engine isolation mounting point includes a raised hollow cylinder at least partially disposed outside a circumference of the raised inner sidewall and extending further than the raised inner sidewall in a direction perpendicular to the major plane of the engine collar. In some embodiments, the plurality of splice plates includes at least two of each of a back splice plate, a front splice plate, an inner wall inner splice plate, and inner wall outer splice plate, and outer wall inner splice plate, and an outer wall outer splice plate. In some embodiments, the first portion of the ring included by the first engine collar piece is 178 degrees to 182 degrees of a circle, and the second portion of the ring included by the second engine collar piece completes a remainder of the circle. In some embodiments, an engine isolation mounting point is located at approximately 45 degrees from each end of each of the first engine collar piece and the second engine collar piece. In some embodiments, the second engine collar piece further includes two landing gear assembly connection points. In some embodiments, the first engine collar piece and second engine collar piece are formed from 4340 steel. In some embodiments, each splice plate of the plurality of splice plates are formed from 17-7PH stainless steel.

In another embodiment, an aircraft includes an engine, four engine isolators, a plurality of engine supports, and an engine collar, where the engine collar includes: a first engine collar piece, having a back portion flat on a first side, and, on a second side opposite the first side, having a raised outer sidewall along an outer circumference of the first engine collar piece, a raised inner sidewall along an inner circumference of the first engine collar piece, and a plurality of connecting walls spaced apart from each other running a length between the raised outer sidewall and the raised inner sidewall; a second engine collar piece, having a back portion flat on a first side, and, on a second side opposite the first side, having a raised outer sidewall along an outer circumference of the second engine collar piece, a raised inner sidewall along an inner circumference of the second engine collar piece, and a plurality of connecting walls spaced apart from each other running a length between the raised outer sidewall and the raised inner sidewall; and a plurality of splice plates joining the first engine collar piece to the second engine collar piece at a narrow portion of the engine, where the engine is wider forward of the narrow point of the engine and wider aft of the narrow point of the engine; where the first engine collar piece and the second engine collar piece together form a ring around the engine; and where the engine collar is connected to the engine on a first side of the engine collar by the four engine isolators, and where the engine collar is connected to the aircraft on a second side of the engine collar through the plurality of engine supports.

In some embodiment of the aircraft, each engine isolation mounting point is 87.5 degrees to 92.5 degrees from a closest next engine isolation mounting point around a circumference of the engine collar. In some embodiment of the aircraft, each engine isolation mounting point is located in a tab extending in from the raised inner sidewall of the first engine collar piece or the second engine collar piece, where each tab is shaped as a rounded protrusion inward from the raised inner sidewall along a major plane of the engine collar, where each engine isolation mounting point includes a raised hollow cylinder at least partially located outside a circumference of the raised inner sidewall and extending further than the raised inner sidewall in a direction perpendicular to the major plane of the engine collar, where an engine isolator at least partially overlaps each engine isolation mounting point when installed, and where a fastener extending through each engine isolation mounting point secures each engine isolator to the engine collar. In some embodiment of the aircraft, the plurality of splice plates includes at least two of each of a back splice plate, a front splice plate, an inner wall inner splice plate, and inner wall outer splice plate, and outer wall inner splice plate, and an outer wall outer splice plate. In some embodiment of the aircraft, the second engine collar piece further includes two landing gear assembly connection points that attach to a forward landing gear assembly through secondary supports. In some embodiment of the aircraft, the first engine collar piece and second engine collar piece are formed from 4340 steel. In some embodiment of the aircraft, the plurality of splice plates are formed from 17-7PH stainless steel.

In a further embodiment a method of installing an engine in an aircraft includes: attaching four engine isolators to the engine at mounting points spaced around a circumference of the engine, where the engine is narrower at the engine mounting points than at least of a portion of the engine forward of the engine mounting points, and a portion of the engine aft of the engine mounting points; attaching a first engine collar piece to two of the four engine isolators using fasteners protruding through two engine isolation mounting points protruding inward from an inner circumference of the first engine collar piece; attaching a second engine collar piece to the remaining two of the four engine isolators using fasteners protruding through two engine isolation mounting points protruding inward from an inner circumference of the second engine collar piece; joining the first engine collar piece to the second engine collar piece using a plurality of splice plates and fasteners extending through the first engine collar piece or the second engine collar piece to form an engine collar; connecting the engine using the engine collar by dropping the engine into position on a plurality of first supports in the aircraft; fastening at least one of the first engine collar piece or the second engine collar piece to the plurality of first supports; installing a plurality of second supports in the aircraft; and fastening the plurality of second supports to the engine collar.

In some embodiments method of installing an engine in an aircraft further includes attaching a forward landing gear assembly to the second engine collar piece by a third set of supports, where the third set of supports provide structural support to the forward landing gear assembly through the engine collar, the first supports, and the second supports. In some embodiments, the first engine collar piece and second engine collar piece are formed from 4340 steel, and where each engine isolation mounting point is 87.5 degrees to 92.5 degrees from a closest next engine isolation mounting point around a circumference of the engine collar. In some embodiments, the plurality of splice plates are formed from 17-7PH stainless steel and includes at least two of each of a back splice plate, a front splice plate, an inner wall inner splice plate, and inner wall outer splice plate, and outer wall inner splice plate, and an outer wall outer splice plate.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An engine collar, comprising:
  a first engine collar piece, comprising a first portion of a ring, and having a back portion, wherein the back portion is flat on a first side and has, on a second side opposite the first side, a raised outer sidewall along an outer circumference, a raised inner sidewall along an inner circumference, and a plurality of connecting walls spaced apart from each other running from the raised outer sidewall to the raised inner sidewall, wherein the connecting walls are substantially perpendicular to a tangent of the raised inner sidewall and raised outer sidewalls along a major axis of the connecting walls;
  a second engine collar piece, comprising a second portion of the ring, and having a back portion, wherein the back portion is flat on a first side and has, on a second side opposite the first side, a raised outer sidewall along an outer circumference, a raised inner sidewall along an inner circumference, and a plurality of connecting walls spaced apart from each other running from the raised outer sidewall to the raised inner sidewall, wherein the connecting walls are substantially perpendicular to the tangent of the raised inner sidewall and raised outer sidewalls along the major axis of the connecting walls, and wherein the first engine collar piece comprising the first portion of the ring and the second engine collar piece comprising the second portion of the ring together comprise a complete ring; and a plurality of splice plates joining the first engine collar piece to the second engine collar piece;

wherein each of the first engine collar piece and the second engine collar piece have two engine isolation mounting points comprising tabs protruding inward from a circumference of the raised inner sidewall, and a plurality of attachment points for connecting the engine collar to a plurality of engine supports.

2. The engine collar of claim 1, wherein each engine isolation mounting point is 87.5 degrees to 92.5 degrees from a closest next engine isolation mounting point around a circumference of the engine collar.

3. The engine collar of claim 1, wherein each tab is shaped as a rounded protrusion inward from the raised inner sidewall along a major plane of the engine collar, and wherein each engine isolation mounting point comprises a raised hollow cylinder at least partially disposed outside a circumference of the raised inner sidewall and extending further than the raised inner sidewall in a direction perpendicular to the major plane of the engine collar.

4. The engine collar of claim 1, wherein the plurality of splice plates comprises at least two of each of a back splice plate, a front splice plate, an inner wall inner splice plate, and inner wall outer splice plate, and outer wall inner splice plate, and an outer wall outer splice plate.

5. The engine collar of claim 1, wherein the first portion of the ring comprised by the first engine collar piece is 178 degrees to 182 degrees of a circle, and wherein the second portion of the ring comprised by the second engine collar piece completes a remainder of the circle.

6. The engine collar of claim 5, wherein an engine isolation mounting point is located at approximately 45 degrees from each end of each of the first engine collar piece and the second engine collar piece.

7. The engine collar of claim 1, wherein the second engine collar piece further includes two landing gear assembly connection points.

8. The engine collar of claim 1, wherein the first engine collar piece and second engine collar piece are formed from 4340 steel.

9. The engine collar of claim 1, wherein each splice plate of the plurality of splice plates are formed from 17-7PH stainless steel.

10. An aircraft comprising:
an engine;
four engine isolators;
a plurality of engine supports; and
an engine collar, comprising:
a first engine collar piece, having a back portion flat on a first side, and, on a second side opposite the first side, having a raised outer sidewall along an outer circumference of the first engine collar piece, a raised inner sidewall along an inner circumference of the first engine collar piece, and a plurality of connecting walls spaced apart from each other running a length between the raised outer sidewall and the raised inner sidewall;
a second engine collar piece, having a back portion flat on a first side, and, on a second side opposite the first side, having a raised outer sidewall along an outer circumference of the second engine collar piece, a raised inner sidewall along an inner circumference of the second engine collar piece, and a plurality of connecting walls spaced apart from each other running a length between the raised outer sidewall and the raised inner sidewall; and a plurality of splice plates joining the first engine collar piece to the second engine collar piece at a narrow portion of the engine, wherein the engine is wider forward of the narrow portion of the engine and wider aft of the narrow portion of the engine;

wherein the first engine collar piece and the second engine collar piece together form a ring around the engine; and wherein the engine collar is connected to the engine on a first side of the engine collar by the four engine isolators, and wherein the engine collar is connected to the aircraft on a second side of the engine collar through the plurality of engine supports.

11. The aircraft of claim 10, wherein each engine isolation mounting point is 87.5 degrees to 92.5 degrees from a closest next engine isolation mounting point around a circumference of the engine collar.

12. The aircraft of claim 11, wherein each engine isolation mounting point is located in a tab extending in from the raised inner sidewall of the first engine collar piece or the second engine collar piece, wherein each tab is shaped as a rounded protrusion inward from the raised inner sidewall along a major plane of the engine collar, wherein each engine isolation mounting point comprises a raised hollow cylinder at least partially located outside a circumference of the raised inner sidewall and extending further than the raised inner sidewall in a direction perpendicular to the major plane of the engine collar, wherein an engine isolator at least partially overlaps each engine isolation mounting point when installed, and wherein a fastener extending through each engine isolation mounting point secures each engine isolator to the engine collar.

13. The aircraft of claim 10, wherein the plurality of splice plates comprises at least two of each of a back splice plate, a front splice plate, an inner wall inner splice plate, and inner wall outer splice plate, and outer wall inner splice plate, and an outer wall outer splice plate.

14. The aircraft of claim 10, wherein the second engine collar piece further includes two landing gear assembly connection points that attach to a forward landing gear assembly through secondary supports.

15. The aircraft of claim 10, wherein the first engine collar piece and second engine collar piece are formed from 4340 steel.

16. The aircraft of claim 10, wherein the plurality of splice plates are formed from 17-7PH stainless steel.

17. A method of installing an engine in an aircraft, comprising:
attaching four engine isolators to the engine at mounting points spaced around a circumference of the engine, wherein the engine is narrower at the engine mounting points than at least a portion of the engine forward of the engine mounting points and a portion of the engine aft of the engine mounting points;
attaching a first engine collar piece to two of the four engine isolators using fasteners protruding through two first tabs located at two engine isolation mounting points on the first engine collar piece, each of the two first tabs protruding inward from an inner circumference of the first engine collar piece;
attaching a second engine collar piece to the remaining two of the four engine isolators using fasteners protruding through two second tabs located at two engine isolation mounting points on the second engine collar piece, each of the second two tabs protruding inward from an inner circumference of the second engine collar piece;

joining the first engine collar piece to the second engine collar piece using a plurality of splice plates and fasteners extending through the first engine collar piece or the second engine collar piece to form an engine collar;

connecting the engine using the engine collar by dropping the engine into position on a plurality of first supports in the aircraft;

fastening at least one of the first engine collar piece or the second engine collar piece to the plurality of first supports;

installing a plurality of second supports in the aircraft; and fastening the plurality of second supports to the engine collar.

18. The method of installing an engine in an aircraft of claim 17, further comprising:

attaching a forward landing gear assembly to the second engine collar piece by a third set of supports, wherein the third set of supports provide structural support to the forward landing gear assembly through the engine collar, the first supports, and the second supports.

19. The method of installing an engine in an aircraft of claim 17, wherein the first engine collar piece and second engine collar piece are formed from 4340 steel, and wherein each engine isolation mounting point is 87.5 degrees to 92.5 degrees from a closest next engine isolation mounting point around a circumference of the engine collar.

20. The method of installing an engine in an aircraft of claim 17, wherein the plurality of splice plates are formed from 17-7PH stainless steel and comprises at least two of each of a back splice plate, a front splice plate, an inner wall inner splice plate, and inner wall outer splice plate, and outer wall inner splice plate, and an outer wall outer splice plate.

* * * * *